United States Patent [19]
Bruneau

[11] 3,988,168
[45] Oct. 26, 1976

[54] FLAT BATTERY AND MANUFACTURE THEREOF

[75] Inventor: Louis O. Bruneau, Weston, Mass.

[73] Assignee: Polaroid Corporation, Cambridge, Mass.

[22] Filed: Oct. 20, 1975

[21] Appl. No.: 624,053

Related U.S. Application Data

[63] Continuation of Ser. No. 478,105, June 10, 1974, abandoned.

[52] U.S. Cl. .................................. 429/129; 429/133
[51] Int. Cl.² .................................... H01M 10/00
[58] Field of Search ............ 136/111, 175, 6 B, 6 S, 136/133

[56] References Cited
UNITED STATES PATENTS

| | | | |
|---|---|---|---|
| 2,880,259 | 3/1959 | Nowotny ............................. | 136/111 |
| 2,971,999 | 2/1961 | Jacquier ........................... | 136/111 X |
| 2,995,614 | 8/1961 | Krueger ............................ | 136/111 |
| 3,607,430 | 9/1971 | Glover .............................. | 136/111 |
| 3,617,387 | 11/1971 | Grulke et al. ...................... | 136/111 |
| 3,674,565 | 4/1972 | Bergum et al. ..................... | 136/111 |
| 3,708,349 | 1/1973 | Macaulay et al. ............... | 136/111 X |
| 3,734,780 | 5/1973 | Bilhorn et al. ..................... | 136/111 |
| 3,770,504 | 11/1973 | Bergum ........................... | 136/111 X |
| 3,784,414 | 1/1974 | Macaulay et al. ............... | 136/111 X |
| 3,833,427 | 9/1974 | Land et al. ........................ | 136/111 |

Primary Examiner—John H. Mack
Assistant Examiner—C. F. Lefevour
Attorney, Agent, or Firm—John P. Morley; John W. Ericson

[57] ABSTRACT

A flat battery structure and method of fabricating it which is characterized by a distinctive integration of the arrangement and dimensions of discrete components of the battery pile structure. Through the select dimensioning and positioning of discrete components of the battery, an especially efficient high speed production process for batteries of improved operational reliability is realized.

32 Claims, 6 Drawing Figures

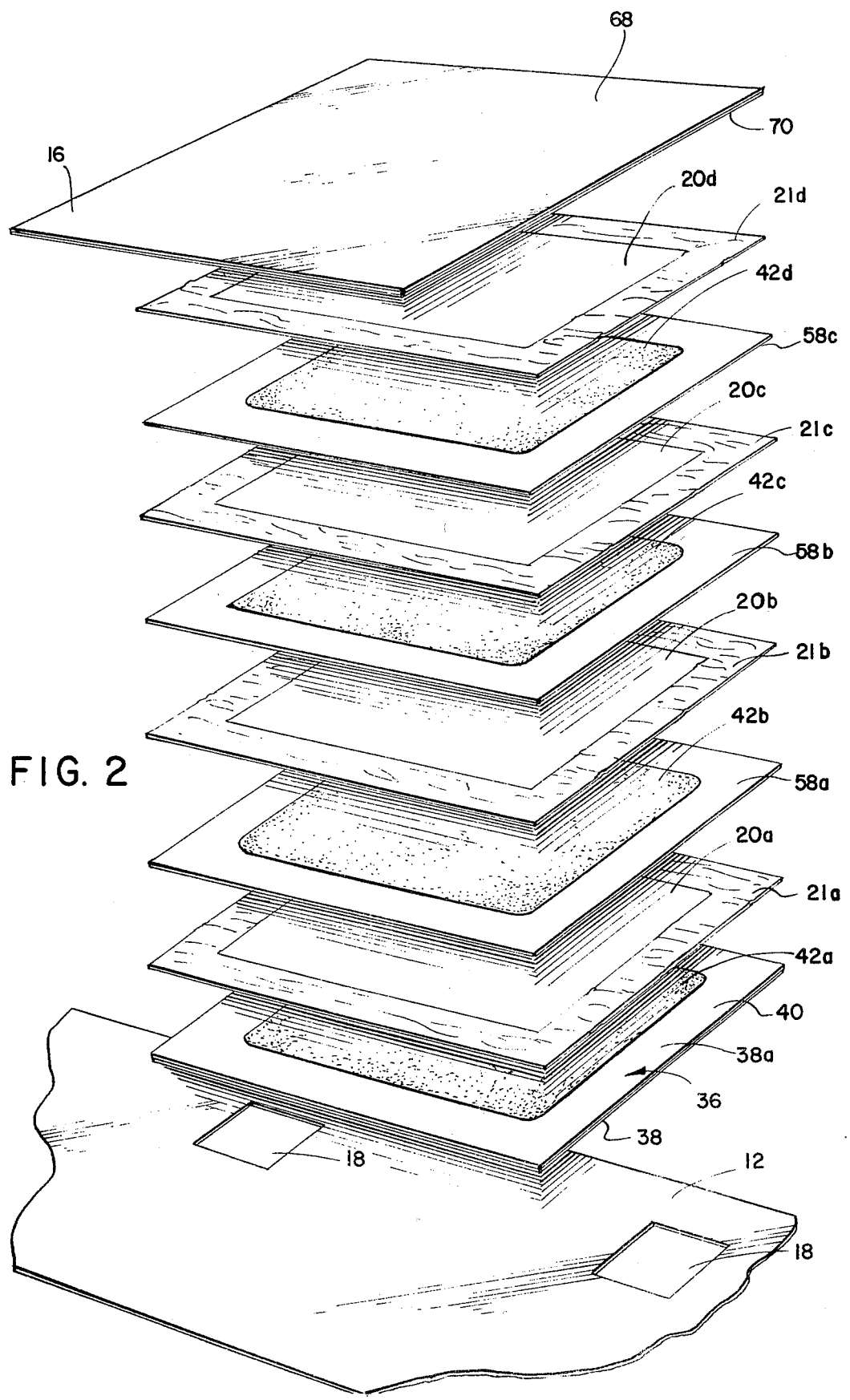

FLAT BATTERY AND MANUFACTURE THEREOF

CROSS REFERENCE TO RELATED PATENT APPLICATIONS

This application is a continuation of U.S. Application Ser. No. 478,105 now abandoned filed June 10, 1974.

BACKGROUND OF THE INVENTION

Part 1. The Field of the Invention

This invention relates to electrical energy power supplies and more precisely, to specialized batteries and processes for producing such batteries which have special utility in packs or assemblies comprising a container holding self-developing film unit(s) integrated with an electrical power supply system.

Part 2. Description of the Prior Art

U.S. Pat. Nos. 3,705,542; 3,543,662; 3,543,663; 3,595,661 and commonly owned, copending U.S. Patent Application Ser. No. 399,321 filed Sept. 21, 1973 by S. M. Bloom, J. W. Foley and N. S. Hadzekyriakides relate to photographic film packs comprising an enclosure containing self-developing film units integrated with a power supply system. Such film packs are presently employed exclusively in a photographic camera sold by Polaroid Corporation of Cambridge, Massachusetts, U.S.A. under the trade name "SX-70".

Essentially, film packs described in those patents and Application comprise an opaque enclosure containing a dark slide for covering an exposure station in a forward wall of the container, a stack of individual "self-developing" film units positioned behind the dark slide, means for urging the stack of film units towards the forward wall to position the uppermost film unit in the stack in the exposure station and an electrical power supply system for operating electrical mechanisms of a camera designed for using the pack.

When the film pack is inserted into the camera, the dark slide is removed through a withdrawal slot at one end of the enclosure to uncover the exposure station and the uppermost film unit is urged into position in the exposure station by the means mentioned before which usually involves a spring biased platen.

After exposure, the uppermost film unit is advanced, from the exposure station through the withdrawal slot into engagement with cylindrical rollers and processing of the exposed film unit is initiated as the unit is advanced between the rollers.

"Self-developing film" of such packs is sometimes described as an integral negative-positive film unit having as essential elements, a photosensitive element having a photosensitive system for providing a diffusion transfer image pattern, an image-receiving element, an opacification system and a rupturable container holding a processing composition. The elements are integrated with the unit so that the processing composition can be distributed within the unit to install a diffusion transfer image pattern in the image-receiving element and the pattern is viewable against a reflective background without separation. The film units are adapted for processing outside the camera since effective protection against further exposure is provided by way of the opacification system which in some integral negative-positive film units is integrated with the unit prior to exposure of the photosensitive system while in others, the opacification system is integrated with the unit after exposure. In the preferred integral negative-positive film units, the opacification system comprises a combination of light-absorbing dyes and a light-reflecting material or pigment and this combination is included in the rupturable container and distributed between the photosensitive and image-receiving elements after exposure. Further details relating to the integral negative-positive film units may be found in U.S. Pat. Nos. 3,415,644; 3,415,645; 3,415,646 and 3,647,437 among others.

As mentioned, the film packs of the present invention also include an electrical energy power souce contained within the enclosure. Essentially, the power source comprises a battery of the type described in detail in U.S. Pat. Nos. 3,543,662; 3,563,805; 3,617,387 and 3,734,780 among others. Such batteries are flat or planar primary batteries of the LeClanche type including a zinc anode system, a manganese dioxide cathode system and an aqueous ammonium chloride, zinc chloride and usually a small amount of mercuric chloride. When the film pack is inserted into the camera, the battery integrated therewith is connected to the camera's electrical system to provide the electrical energy sufficient to operate any circuits of the camera which can include an automatic exposure control circuit, a flash mode circuit, film transport circuits and processing mechanism circuit among others. The output of the battery is designed to continue to supply the requisite energy until all film units in the pack are exposed and transported from the camera. At that time, the pack—containing the integral battery—is discarded.

The desired performance characteristics of batteries of the type described above are well defined. Essentially, such batteries must be compact and specifically configured for effective integration and assembly with the film pack and at the same time provide the requisite electrical energy for efficient operation of the camera and related accessories until depletion of the supply of film units in the film pack. Additionally, the batteries are designed to be discarded together with the empty film pack. Accordingly, an economic constraint is involved requiring that the batteries be produced by way of high volume, low cost processes which inevitably dictates the involvement of a high speed, on-line continuous process capable of efficiently assembling batteries and providing maximum production of acceptable batteries with minimum rejects.

In the past, a high volume, low cost production process for batteries of the type described has involved assembly techniques utilizing wide, continuous and multi-zoned webs of sheet elements of the battery. These webs are selectively manipulated along an assembly line to simultaneously provide an interconnected plurality of individual battery assemblages which are finally cut into discrete batteries.

Battery assembly operations involving use of wide, multi-zone webs of sheet elements of the battery have met with some difficulties. For example, some of the sheet elements of the battery such as the electrode supports and intercell connectors are fabricated of webs comprising electrically conductive webs providing sheet element and electrochemically active materials involved in the battery assembly operation provide an electrically interconnected plurality of individual batteries which can result in back-up voltages being generated during assembly. Such back-up voltages can adversely affect battery performance unless specialized precautions are employed to minimize or compensate for the phenomenon. Also the requisite of cutting or shearing the interconnected plurality of individual battery assemblages into discrete batteries can increase product rejection because of edge shorting which can occur between contiguous electrically conductive sheet elements due to improper cutting or shearing.

An improved, high volume, low cost production process for producing batteries of the type to which the present invention pertains is disclosed in commonly owned U.S. Patent Application Ser. No. 478,106 filed concurrently with this application by the present inventor. Essentially, the process disclosed involves a battery assembly operation involving a continuous web of electrically insulative material which functions as a carrier on which the discrete components of each battery are assembled to provide a continuous web of individual non-electrically interconnected batteries. Because electrical interconnection between the individual battery assemblies does not exist, back-up voltages or the like are not obtained. Another advantage presented by the above-described process resides in the manner by which the individual batteries assembled on the carrier are cut into discrete batteries. The cutting operation involves cutting of the carrier without exposure of electrically conductive sheet elements of the battery to cutting or shearing thereby avoiding edge shorting possibilities.

The present invention is addressed to high volume, low cost battery assembly operations wherein discrete sheet elements and electrochemical components are employed in assembling of flat, planar, primary batteries of the type described before. Essentially, the present invention provides an improved, highly efficient assembly process for such batteries which permits maximum production of batteries providing the desired performance characteristics with minimal product rejection.

BRIEF SUMMARY OF THE INVENTION

The distinctive feature of the products and processes of the present invention involves a unique selection of the overall dimensions of separators involved in the fabrication of the batteries to which the present invention pertains. Essentially, the dimensions of the separator are selected so that the overall peripheral dimensions of the separator exceed the overall peripheral dimensions of sheet elements or electrochemical components integrated therewith. By employing separators of preselected dimensions, the overall efficiency of the assembly process is improved especially with respect to heat sealing operations involved in the assembly operation and with respect to obtaining maximum efficiency for the function assigned to the separator both during and after the assembly process. For example, the improved assembly process of the present invention provides maximum production of batteries exhibiting the desired performance characteristics and batteries so produced exhibit the desired balance of performance characteristics over extended times.

The advantages presented by way of the practice of the present invention are obtained broadly in those processes wherein flat, planar batteries are assembled from discrete sheet elements to provide individual non-electrically interconnected batteries. Accordingly, such advantages can be obtained in battery assembly processes where discrete elements and components are assembled to provide an individual battery without the requirement of cutting. Also the advantages are obtained in those processes where assembly of the sheet elements and components is conducted on a continuous carrier which is later cut to provide the so assembled battery in discrete form. In accordance with the preferred practice of the present invention, the assembly of the sheet elements involves the use of a continuous carrier and the following discussion of the preferred embodiment of the invention relates to such an assembly process.

FIG. 2 is an exploded perspective representation of the components of a battery structure according to the invention revealing the relative orientation of sheet type components thereof;

DETAILED DESCRIPTION OF THE PREFERRED EMBODIMENT OF THE INVENTION

Figure 1:
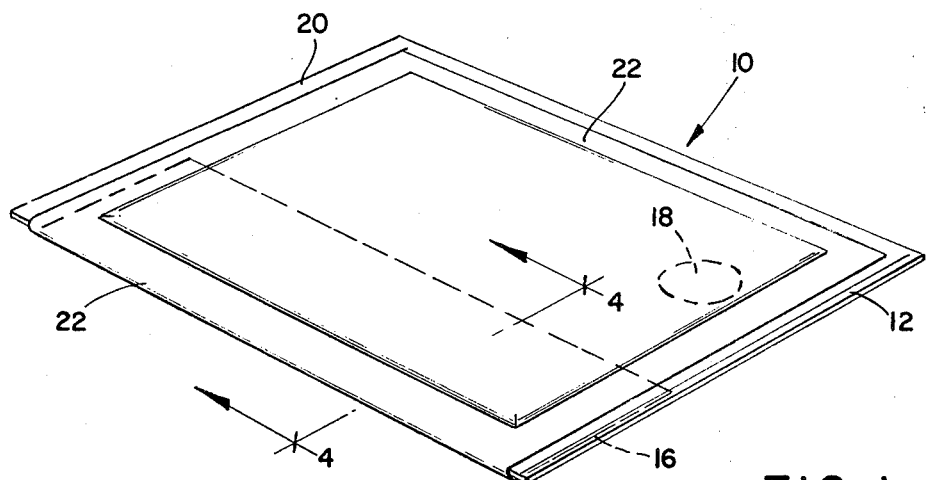
FIG. 1 is a perspective view of a flat primary battery structure according to the invention as it exists prior to packaging.

A multicell flat battery structure is presented generally at 10 in FIG. 1 as it would appear in an electrochemically active state following component build-up in accordance with the method of the instant invention. Certain of the features of the invention will appear from an examination of this perspective view. Note, for instance, the presence of an electrically insulative sheet 12 located at the bottom of the pile structure. The length of insulative sheet 12 as well as its widthwise dimension are selected such that it extends slightly beyond the peripheries of the electrically active laminar components of battery 10. The upwardly facing surface of battery 10 is present as the outer metal surface of an anode electrode current collector assembly 14. The electrode current collector assembly 14 is folded about one side of battery structure 10 to present a downwardly facing metallic surface portion as at 16 which is utilized to provide a terminal defining surface for the battery. An opening shown in dashed fashion at 18 and formed in insulative sheet 12 provides access to the downwardly facing metal surface of a cathode electrode collector assembly (shown in FIG. 4) which is attached to the upward facing surface of sheet 12. With the arrangement, cathode and anode terminals may be provided on one flat surface of the battery structure 10. Also revealed in FIG. 1 are the peripheral edges of electrically insulative separator elements 20. The slightly depressed peripheral portion 22 of the assembly is occasioned from peripheral sealing procedures provided in the course of assembly of the structure 10. This depression necessarily becomes more exaggerated in the sectional views of the battery.

Figure 4:
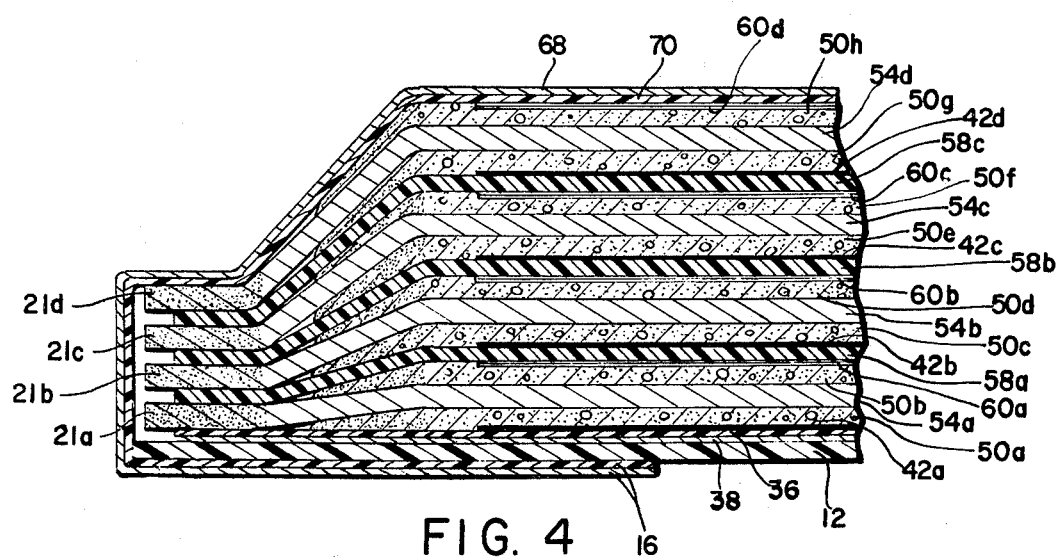
FIG. 4 is a sectional view of a battery structure according to the invention taken through the plane 4—4 of FIG. 1.
Figure 3:
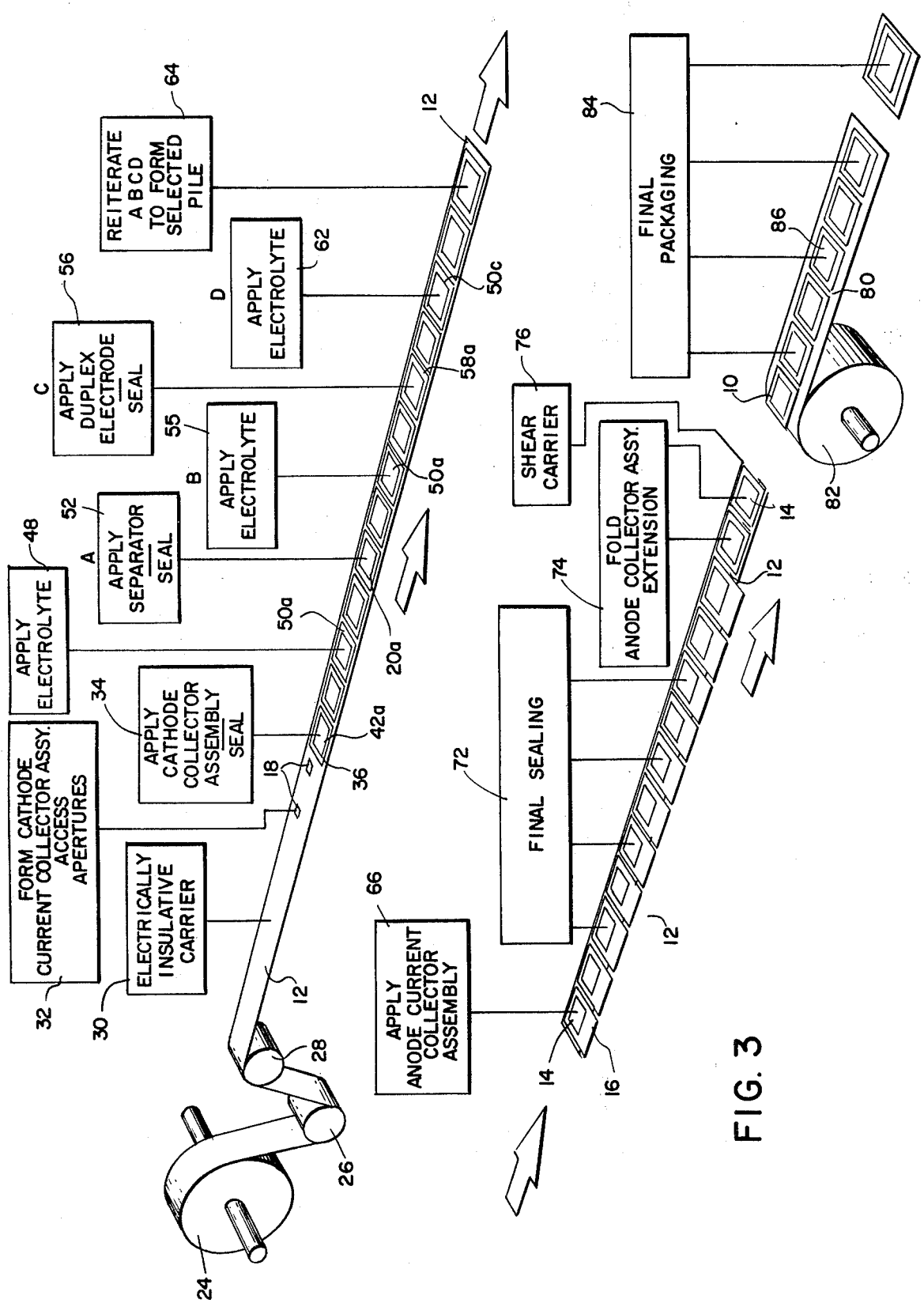
FIG. 3 is a schematic diagram showing, in block fashion, the functions of fabricating stations along an assembly line for producing the battery structure of the invention.

Looking now to FIGS. 2, 3 and 4, the structure of battery 10 is revealed in more detail and the method of the invention for fabricating it utilizing appropriately high volume production techniques is shown. The preferred production technique of the invention is typified in the utilization of a web type carrier 12 preferably an electrically insulative sheet. Sheet 12 may be drawn from a suitable roll type supply 24 and introduced to a fabricating industrial line through appropriate web drives (not shown) including tension adjusting rolls as at 26 and 28. Web 12 preferably is introduced having a width selected to achieve the geometry described in connection with battery 10 of FIG. 1. Accordingly, its width is selected as being slightly greater than the electrically active components of the battery structure or at least as wide as separator components 20. Materials selected for the web, in addition to being electrically insulative, should be chemically inert and are preferably a plastic material, for instance, a film of an organic polymer which is capable of being heat sealed. Suitable materials are "Mylar", a product of E. I. DuPont de Nemours and Co. or "Estar", a product of Eastman Kodak, Inc. which is a film of polyethylene terephthalate or an unfilled polyvinyl chloride or the like. For photographic applications as described in the above-referenced U.S. Pat. No. 3,543,662, sheet or web 12 may be coated with a substance opaque to actinic radiation incident thereon to aid in maintaining the light-tight integrity of any film container within which the batteries are incorporated. A black "Mexican lacquer" coating is found to be suitable for this purpose.

Web or carrier 12 is manuvered through the production or assembly area with an intermittent motion in accordance with the spacing of individual multicell battery or pile assemblies which are made thereon. The provision of the insulative carrier 12 is revealed by function or station block 30 in FIG. 3, while the initial pitch or spacing between the battery units on the carrier web is established by the formation of access apertures 18 as revealed at station or function block 32. By photo-detecting an edge of these apertures 18, suitable spacing and registration controls may be provided throughtout all of the assembly stations of the production line. While openings 18 may take a variety of shapes, a convenient arrangement is an opening having a rectangular periphery formed forward one side of web 12 in a position such that a terminal defining surface is in position for appropriate contact with the instrumentalities within which the battery is utilized as a power source.

As revealed at station function block 34 in FIG. 3, the component build-up upon web 12 is commenced by positioning a discrete cathode current collector assembly 36 in appropriate registry over access opening 18. Assembly 36 is a discrete laminar structure including a metallic sheet or foil current collector 38 (FIG. 4), preferably an annealed tin coated steel or an aluminum or lead sheet material on the order of less than 10 mils in thickness, which is laminated to a polymeric current collector 40. Collector 40, in turn, preferably is a sheet of electrically conductive carbon-impregnated vinyl film sold under the trade designation "Condulon" having a thickness in the order of about 2 mils and configured having the same relative external or peripheral dimensions as metal surface 38. Predeposited over film surface 40 is now dry active positive material 42, i.e., a cathodic paste deposition. Cathode 42 is positioned inwardly from the periphery of collector 40 to provide clear surfaces for subsequent sealing procedures and, for providing a Le Clanche electrochemical system, may be present as a mixture of manganese dioxide (depolarizer) and electrically conductive carbon dispersed in a polymeric binder. Of course, the battery structure may be designed to utilize any of a variety of known positive electrode materials such as other inorganic metal oxides, for instance, lead oxide, nickel oxyhydroxide, mercuric oxide, and silver oxide, inorganic metal halides such as silver chloride and lead chloride, and organic materials capable of being reduced such as dinitrobenzene and azodicarbonamide compounds.

When the preformed laminar collector assembly 36 is positioned as by "pick-and-place" technique common in the art, portions of the periphery of web 12 will extend beyond the widthwise periphery of the assembly to provide a geometry facilitating the insulation thereof. The peripheral area of assembly 36 is heat sealed to web 12 following its placement. As revealed at station function block 48 in FIG. 3, web 12 is driven to carry the subassembly including current collector assembly 36 to a position where electrolyte is applied coextensive the facing surface of cathode material 42. Represented in FIG. 4 at 50a, electrolyte 58 ordinarily will comprise a conventional aqueous solution of ammonium chloride/zinc chloride about 4:1 dispersed in a polymeric thickener such as hydroxyethyl cellulose, etc., for example, on the order of about five percent (5%) or more. In addition, a small quantity of mercuric chloride may be present in the electrolyte as a corrosion inhibitor. Preferably, the electrolyte is deposited over cathode 42 utilizing positive displacement techniques as opposed to doctoring, silk screening and the like.

As revealed at function block 52, the next station in the assembly procedure applies a discrete electrically insulative separator element 20A. As is more clearly illustrated in FIG. 4 and as has been described in connection with the separator elements described generally at 20 in FIG. 1, separator 20a is formed having a rectangularly shaped periphery which extends slightly but importantly beyond all electrochemically active components of the battery. Note in this regard, that the separator element extends slightly beyond the periphery of cathode current collector assembly 36. Element 20a as well as all separators within a pile structure may be constructed of and comprise a conventional battery separator material such as aqueous electrolyte permeable fibrous sheet materials, for example, fibrous and cellulosic materials, woven or nonwoven fibrous materials such as polyester, nylon, polypropylene, polyethylene or glass. A peripheral, frame shaped portion of each separator, as at 21a, is impregnated with a thermal sealing electrically insulative adhesive such as a polymeric hot melt adhesive, for example, a conventional hot melt vinyl adhesive suited to secure each separator with contiguous anode and cathod carrier sheets, such as polymeric current collector sheet 40. Note that sealing periphery 21a is positioned well outwardly from the area of influence of electrolyte gell 50a. Following appropriate placement of discrete separator element 20a, its peripheral portion 21a is thermally sealed to the subassembly including carrier sheet 12 and collector assembly 36, a thermally induced bond being available between sealant 21a and the noted polymeric current collector sheet 40.

The dimensional configuration of separator 20 as well as the adherent capability provided by frame shaped area 21 constitute a distinctive feature the present invention and provide special advantages in the assembly of batteries comprising such separators. For example, peripheral frame shaped area 21 provides an effective adherent capability providing an especially effective bonding area presenting maximum available bonding surface thereby providing bonding surface tolerances which are especially advantageous in low cost, high speed assembly operations involving heat lamination or sealing steps and devices involved in effectively performing such steps. Additionally, because frame shaped area 21 extends beyond all electrochemically active sheet elements adhered thereto, contact between such elements that could occur because of the application of heat and/or pressure during the lamination or edge sealing operations is effectively minimized, if not completely avoided. Accordingly, the integration of this feature presents to the art a low cost high speed battery assembly process providing an especially high degree of control for maximum production of batteries of the desired performance characteristics with minimal rejects.

As is represented at function block 54 in FIG. 3, the pile subassembly now moves to a second station for the application of electrolyte. Identified in FIG. 4 at 50b, this second electrolyte application is made over the central portion of separator 20a within the porous area thereof not incorporating sealant 21a. With this electrolyte application, a continuous electrolytic association between the cathode 42a and a next adjacent anode may be effected.

The associated anode for the initial cell is provided, as shown at function block 56 in FIG. 3, with the positioning over the subassembly of a discrete duplex electrode 58a. Serving as an intercell connector, duplex electrode 58a may be prefabricated of a sheet or film of electrically conducting material, preferably a sheet of electrically conductive carbon impregnated vinyl which, as described earlier, in connection with layer 40 may be "Condulon" or the like. Materials for the intercell connectors should be impervious to the electrolyte utilized within the cell structure, must provide a function for conducting electrical current between the positive electrode in one cell and the negative electrode in the next cell, should not create undesired electrochemical reactions with the electrodes or other components of the battery and should be heat sealable. Preformed centrally upon the lowermost side of the conductive sheet is a distribution of active zinc negative or anode material 60a which, in conventional fashion, is amalgamated with, for instance, mercury by contact with mercuric chloride within the electrolyte of the cell. Oppositely disposed upon the conductive sheet of the duplex intercell connector 58a is another dry deposition of active positive material 42b which is present, for instance, as a manganese dioxide/electrically conductive carbon mixture dispersed in a polymeric binder as described earlier. The electrically conductive sheet forming the duplex electrode 58a is configured in discrete fashion having a peripheral dimension corresponding with that of cathode current collector assembly 36. As such, it may be observed in FIG. 4 that separator 21a will extend beyond the periphery of electrode 58a. Following its positioning, the duplex electrode sheet is heat sealed about its outer periphery to the sealant 21a of earlier positioned separator 20a. As a consequence, the first electrochemically active cell of the pile structure will have been assembled. Note at this juncture, that the active cell is carried by an electrically insulative and chemically inert carrier web 12 in spaced relationship and separated from other multicell components such that no electrical association of the discrete cells is derived along the production or assembly line.

As is revealed at the function block 62 in FIG. 3, the unit cell subassembly is moved by carrier 12 to a station applying electrolyte as identified in FIG. 4 at 50c. This deposition in combination with cathode material 42b commences the build-up of the next serially coupled contiguous cell. Accordingly, the above-described sequence of construction may be reiterated as shown at block 64 of FIG. 3 by select repetition of the series of station procedures employed in connection with blocks 52, 54, 56, and 62. Note in this regard that these blocks, respectively, have been labeled "A", "B", "C", and "D", and identified in that sequence in block 64. In each reiteration the dimensional configurations of the discrete elements remain identical as well as their positioning in registration to achieve a requisite laminar structure. Turning to FIG. 4, note that a four cell pile structure is illustrated as including separators 20a–20d, electrolyte depositions 50a–50h, duplex intercell connector elements 58a–58c, cathode electrode depositions 42a–42b, and anode depositions 60a–60d.

Following the final electrolyte deposition 50h (FIG. 4), the multicell subassembly is moved by web 12 to a station applying a discrete anode current collector assembly as shown in FIG. 3 at block 66. Identified earlier at 14 in FIG. 1, and illustrated in more detail in FIGS. 2 and 4, assembly 14 is configured in similar laminar fashion as earlier described assembly 36. In this regard, assembly 14 is constructed having a metallic sheet terminal surface portion preferably formed of annealed tin coated steel sheet material on the order of less than 10 mils in thickness, as shown at 68, in laminar electrical and physical bond with a polymeric current collector sheet of electrically conductive carbon impregnated vinyl film 70. Sheets 68 and 70 are coextensive in dimension, however, such dimension is extended, as previously described at 16, to a widthwise dimension protruding beyond the adjacent edge of carrier web 12. Centered within that portion of assembly 14 excluding extension 16 is active zinc negative material 60d predeposited thereupon in similar fashion as provided at anode deposits 60a–60c. Upon being positioned as shown in FIG. 2, the multicell pile subassembly is moved into a final sealing area defined by function block 72. Within this area, the peripheries of the discrete components of the multicell assembly are subjected to a series of heat-pressure sealing operations to assure the integrity of all peripheral seals within the assembly. Through the use of multiple stage sealing, excessive heat build-up is avoided which otherwise may adversely effect the operative quality of the electrolyte depositions within a battery. It should be understood that each sealing step throughout the above-described assembly procedure preferably is carried out as a separate step in conjunction with the incremental advancement of cell subassemblies upon carrier web 12. As mentioned before, the dimensional configuration of separator 20 is designed to provide a protective function during all of the heat sealing steps to prevent any contact between the electro chemically active elements adhered thereto which may occur by reason of the application of heat or pressure to the battery assembly elements.

As revealed at block 74 in FIG. 3, following final sealing, the extension 16 of anode collector assembly 14 is folded around the edge of the multicell assembly to a position wherein surface 70 thereof abuts against the underside of web 12. As described in connection with FIG. 1, this exposes the metallic surface 68 of assembly 14 to the underside of the battery in juxtaposition to the metallic surface 38 of collector assembly 36. A select portion of the surface of metallic layer 38 is accessed through rectangular access opening 18 initially formed in web 12. The terminals of the multicell battery 10, therefore, are on one side of the battery and in conveniently spaced juxtaposition.

Looking to FIG. 4, it may be observed that no additional insulative materials are required to accommodate for the noted folding of extension 16 inasmuch as separator peripheries 21a–21d extend beyond intercell connectors 58a–58c, while the complementing peripheral edge and exposed surface of electrically insulating carrier web 12 provides insulative protection for collector assembly 36. Accordingly, the structure is simply formed, retaining a high reliability through the geometry of its component discrete elements. Web 12 then carries the battery assemblies 10 to a shearing station depicted in FIG. 3 at 76. At this point, electrically insulative web 12 is sheared to provide discrete battery units such as that shown in FIG. 1. As noted earlier, no electrical interconnection is formed between the web-connected multiplicity of subassemblies, therefore, no voltage build-up phenomena is witnessed. Further, no electrically conductive material, for instance, the polymeric electrically conductive materials and metal foils are cut or sheared within an electrochemical enviroment on the production line. Only the electrically insulative carrier 12 is sheared. As a consequence, edge shorting occasioned during the formation of discrete elements in substantially eliminated.

Figure 5:
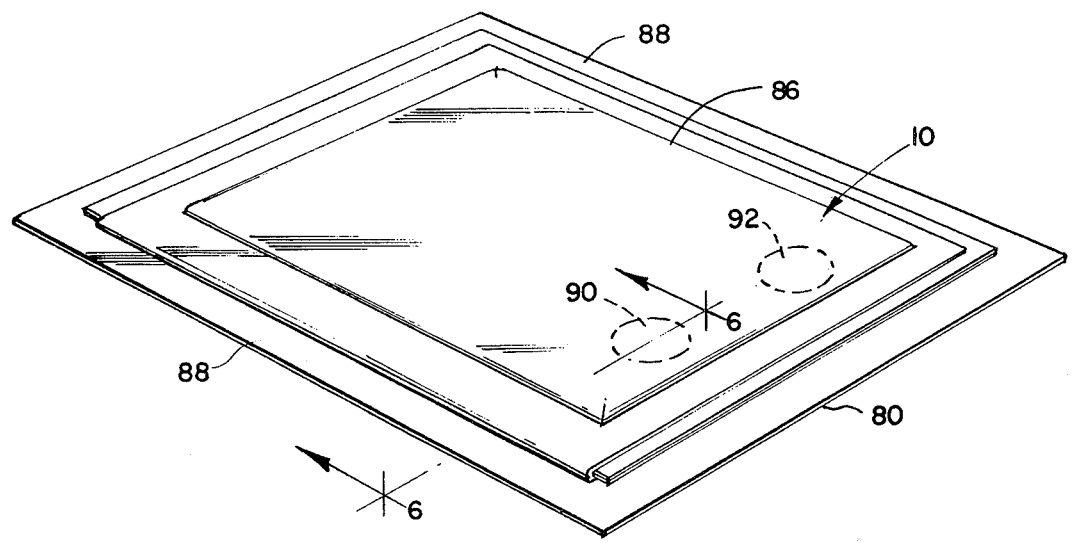
FIG. 5 is a pictorial view of the battery structure of the invention showing it following a final packaging thereof.
Figure 6:
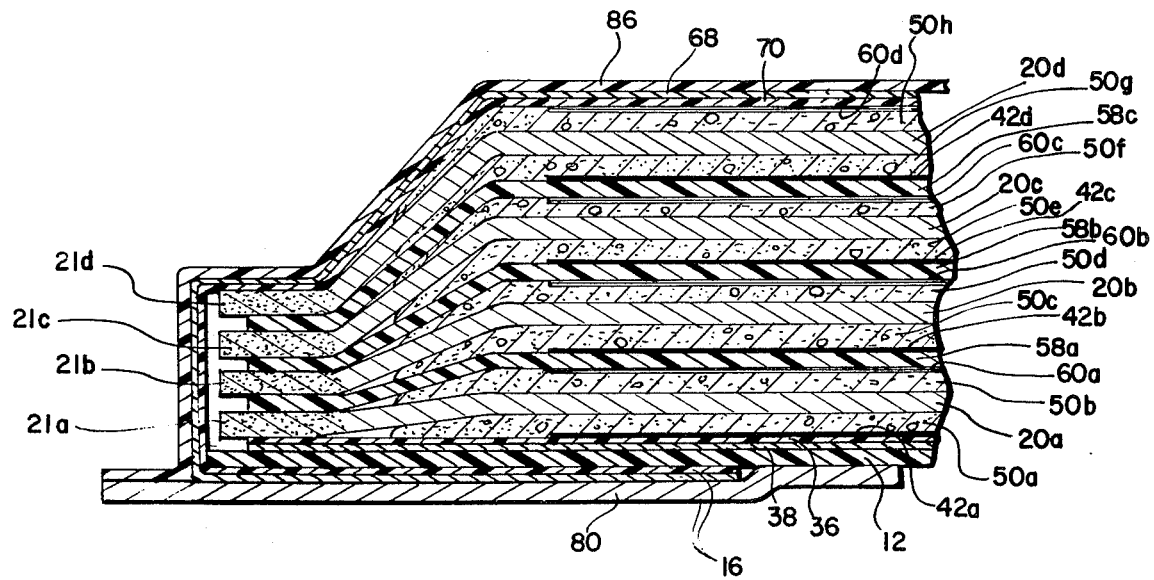
FIG. 6 is a sectional view of the structure of FIG. 5 taken through the plane 6—6 thereof.

Following shearing of web 12, the discrete battery units 10 are positioned upon a continuous carrier roll of cardboard stock 80 shown extending from a supply roll 82 in FIG. 3. Stock 80 is provided having a widthwise dimension greater than that of the completed battery assembly 10 and an upward facing surface having formed thereon a low temperature heat sealing material upon which battery assemblies 10 are positioned. As depicted generally at function block 84, final packaging of the battery units 10 may then take place upon this insulated carrier 80. In one such packaging arrangement, the forward edge of battery elements 10 is heat sealed to the adhesive coating of card stock 80 at the forward edge thereof through the use of a simple hot bar technique. The thus attached battery units are then moved by the continuous web card stock through a station wherein a thin electrically insulative film having a heat sealable coating, also electrically insulating, is positioned over the card stock-battery combination in continuous fashion. This overwrap is depicted in FIG. 5 at 86. Upon positioning of overwrap 86, the peripheral portion 88 of card stock 80 is sealed to overwrap 86 utilizing a heat sealing technique following which the card stock 80, carrying the individual battery components 10, is sheared to provide discrete packaged battery units. A finally packaged battery is shown in cross-section in FIG. 6.

Returning to FIG. 5, two access apertures 90 and 92 are shown formed in appropriated position within card stock 80. Having a round configuration, apertures 90 and 92, respectively, provide access to the outwardly facing metallic surfaces provided by wrap-around portion 16 of collector assembly 14 and surface 38 of collector assembly 36 as accessed from opening 18.

Many modifications of details presented in the above description which is offered for the purpose of illustrating the preferred embodiment of the invention may be made without departing from the spirit and scope of the invention defined in the appended claims. For example, as mentioned the use of separators of the described distinctive dimensional configuration is not necessarily confined to assembly operations wherein discrete battery elements or components are assembled on a web carrier. Instead, such separators may be employed advantageously in battery assembly processes involving the assembly of discrete, elements or components without the use of such a carrier. Accordingly, it is intended that all matter contained in the above description or shown in the accompanying drawings shall be interpreted as illustrative and not in a limiting sense.

What is claimed is:
1. In a flat primary battery structure comprising sheet type separators between electrochemically active battery sheet elements comprising anode materials, cathode materials and electrolyte combined with sheet type electrically conductive intercell connectors and electrically conductive oppositely disposed sheet type current collector elements combined to form a series connected multicell structure by seals entirely surrounding said electrochemically active elements and formed between the peripheries of the sheet type, electrically conductive, intercell connectors and contiguous portions of the sheet type separators;

the improvement wherein the overall peripheral dimensions of the separators exceed the overall peripheral dimensions of the connectors and active elements and the peripheral dimensions of the intercell connectors exceed the peripheral dimensions of the electrochemically active elements so that the peripheral portions of the separators extend beyond all the peripheral portions of the electrochemically active elements and intercell connectors sealed thereto.

2. The battery of claim 1 further including an electrically insulating sheet material attached extremely against one surface of said sheet collector element and at least coextensive therewith.

3. The battery of claim 2 wherein said electrically insulating sheet material is configured having an access opening therein for exposing a select portion of the said surface of said one said sheet collector element to provide a terminal for said battery structure.

4. The battery of claim 4 wherein a said sheet collector element opposite said attached collector element is configured such that a portion thereof is foldable against said electrically insulating sheet material so as to provide a terminal defining surface of said battery.

5. The battery of claim 2 wherein:
said electrically insulating sheet material is configured having an access opening therein for exposing a select portion of the said surface of said one said sheet collector element to provide a terminal for said battery structure; and
said sheet collector element opposite said attached collector element is configured such that a portion thereof is foldable against said electrically insulating sheet material so as to provide another terminal defining surface of said battery adjacent said last mentioned terminal.

6. The battery of claim 2 wherein said electrically insulating sheet material is polyethylene terephthalate.

7. The battery of claim 2 in which said electrically insulating sheet material is opaque to actinic radiation incident thereon.

8. The battery of claim 2 wherein said electrically insulating sheet material is configured having a size at least coextensive with said sheet type separator elements.

9. The battery of claim 5 including packaging means encapsulating said battery structure and including openings for selectively exposing said terminal surfaces.

10. In a flat battery comprising the combination of:
means defining a series connected, multicell structure including first and second outwardly disposed electrodes, electrolyte layers and separator means comprising sheet type separators having sheet type electrically conductive intercell connectors whose peripheries are sealed to contiguous portions of said separators to form seals entirely surrounding said electrolyte layers;
first and second flat sheet collector means electrically coupled, respectively, with the first and second outwardly disposed electrodes;
the improvement wherein the overall peripheral dimensions of the separators exceed the overall peripheral dimensions of the first and second electrodes and of the conductive connectors so that the peripheral portions of the separators extend beyond all the peripheral portions of the electrodes and of the conductive connectors sealed thereto.

11. A battery of claim 10 further including an electrically insulative sheet mounted adjacent a select one of said first and second flat sheet collector means and having an access opening formed therein to expose a portion of the surface of said select collector means so as to define a terminal of said battery.

12. The battery of claim 10 in which said electrically insulating sheet material is configured having dimensions at least coextensive with said select one of said flat sheet collector means.

13. The battery of claim 10 wherein one said flat sheet collector means is configured such that a portion thereof is foldable against said electrically insulative sheet so as to provide a terminal defining surface of said battery.

14. The battery of claim 10 in which said electrically insulative sheet is opaque to actinic radiation incident thereon.

15. The battery of claim 10 in which said electrically insulative sheet is polyethylene terephthalate.

16. The battery of claim 13 including packaging means for encapsulating said battery structure and including access openings for selectively exposing said terminal defining surfaces.

17. In a method for constructing flat battery units comprising the steps of assembling the elements and components of the battery by fixedly placing in selectively spaced alignment a predetermined sequence of electrolyte, anode and cathode materials in combination with discrete sheet type separators and discrete electrically active battery sheet elements including current collectors and sheet type, electrically conductive, intercell connectors to form a discrete series connected, multicell structure assembly by sealing the peripheries of the sheet type, electrically conductive, intercell connectors to contiguous portions of the sheet type separators to form continuous seals entirely surrounding the anode, cathode and electrolyte materials;
the improvement wherein the overall peripheral dimensions of the separators are formed to exceed the overall peripheral dimensions of the connectors sealed thereto, and wherein said connectors are placed within the boundaries of said separators so that said separators overlap said connectors on all sides.

18. The method of claim 17 wherein said sequence of electrolyte, anode and cathode materials, separators and sheet elements are fixedly placed in selectively spaced alignment on a continuous carrier sheet of electrically insulative material.

19. The method of claim 18 in which said continuous carrier sheet is provided having a widthwise dimension substantially corresponding with the width of a said flat battery unit.

20. The method of claim 18 including the step of providing access openings within said continuous carrier sheet to expose the surface of a said current collector thereby defining a terminal surface for each said constructed discrete flat battery units.

21. The method of claim 18 wherein the said placement of said flat cell assemblies is commenced with the step of fixedly positioning a first said current collector upon said continuous carrier, said current collector having a widthwise dimension less than the width of said carrier sheet.

22. The method of claim 20 wherein said access openings are provided at a predetermined repetitive spacing along said carrier sheet.

23. The method for constructing flat battery units of claim 21 including the step of providing access openings within said continuous carrier sheet to expose the surface of a said current collector thereby defining a terminal surface for each said constructed discrete flat battery units.

24. The method of claim 23 wherein the said placement of said flat cell assemblies in concluded with the step of fixedly positioning a second said current collector having a widthwise dimension greater than the width of said carrier sheet and extending beyond a width defining edge thereof.

25. The method of claim 24 wherein the placement of said flat cell assemblies includes the step of folding the portion of said second current collector extending beyond said carrier sheet over and in juxtaposition against said carrier sheet to define a terminal surface of said flat battery unit.

26. The method of claim 25 including the step of packaging said discrete flat battery units in a manner exposing relatively spaced and dimensional portions of said current collectors.

27. In a method for constructing flat multicell batteries, the steps of:
providing a continuous carrier sheet of electrically insulative material;
fixedly positioning discrete first current collector assemblies in selectively spaced relationship upon said continuous carrier sheet;
forming a predetermined number of cells separated by sheet type electrically conductive intercell connectors upon each said collector assembly, each cell including cathode and anode electrodes between which there is disposed electrolyte and a sheet type separator, the electrodes and electrolyte lying within the boundaries of said intercell connectors and said first current collector assembly, and the separator extending beyond the boundaries of said intercell connectors and said first current collector assembly on all sides, by intersealing the peripheries of the sheet type, electrically conductive intercell connectors and said first current collector assembly to contiguous portions of the sheet type separator means, thereby forming continuous seals entirely surrounding the electrodes and electrolyte of all but the outermost cell;

positioning discrete second collector assemblies over and in electrical association with the outermost of said cells to form a multicell unit, and sealing said second collector assembly to the outermost separator to complete a continuous seal about the electrodes and electrolyte of said outermost cell, said second collector assemblies having a width selectively extending beyond the edge of said continuous carrier sheet;

folding said width of said second collector assembly extending beyond said carrier sheet about the edge thereof to a position juxtaposed against a surface thereof; and sealing the periphery of each said multicell unit.

28. The method of claim 27 in which said continuous carrier sheet is provided having a widthwise dimension substantially corresponding with the width of a said flat battery unit.

29. The method of claim 27 including the step of providing access openings within said continuous carrier sheet to expose the surface of a said current collector thereby defining a terminal surface for each said constructed discrete flat battery units.

30. The method of claim 27 including the step of:
cutting said continuous carrier sheet between said multicell units.

31. The method of claim 27 including the steps of:
cutting said continuous carrier sheet between said multicell units; and
packaging said multicell units in a mannner exposing selectively spaced and dimensioned portions of said current collector.

32. The method of claim 25 wherein said continuous carrier sheet is provided having a widthwise dimension corresponding with the width of one said battery.

* * * * *